Sept. 28, 1965 S. A. FRANCIS ETAL 3,209,208

MOUNTING ASSEMBLY FOR MODULAR ELECTRONIC UNITS

Filed Aug. 14, 1961 3 Sheets-Sheet 1

INVENTORS
SAMUEL A. FRANCIS
ARTHUR W. SINKINSON
BY COURTLAND B. CONVERSE
Moses, Nolte & Nolte
ATTORNEYS Sept. 28, 1965 S. A. FRANCIS ETAL 3,209,208

MOUNTING ASSEMBLY FOR MODULAR ELECTRONIC UNITS

Filed Aug. 14, 1961 3 Sheets-Sheet 2

INVENTORS
SAMUEL A. FRANCIS
ARTHUR W. SINKINSON
BY COURTLAND B. CONVERSE

Moses, Nolte & Nolte
ATTORNEYS

MOUNTING ASSEMBLY FOR MODULAR ELECTRONIC UNITS

Filed Aug. 14, 1961 3 Sheets-Sheet 3

INVENTORS
SAMUEL A. FRANCIS
ARTHUR W. SINKINSON
BY COURTLAND B. CONVERSE
Moses, Nolte & Nolte
ATTORNEYS 3,209,208

MOUNTING ASSEMBLY FOR MODULAR ELECTRONIC UNITS

Samuel A. Francis, Marion, Arthur W. Sinkinson, Mattapoisett, and Courtland B. Converse, Marion, Mass., assignors, by mesne assignments, to The Sippican Corporation, Mattapoisett, Mass., a corporation of Massachusetts Filed Aug. 14, 1961, Ser. No. 131,250
6 Claims. (Cl. 317—100)

This invention relates to electronic packaging in general and in particular to an improved modular packaging method and apparatus wherein the compressive strength of the electrical units themselves, along with the compressive strength of the surrounding structure, is utilized to yield an assembly that is extremely rigid and easily alterable to larger or smaller assemblies.

In the past, when it was required that conventional electrical circuits employing vacuum tubes, etc., operate in an environment where high accelerations and vibrations would be experienced, it was the practice to attempt to design a mounting for the electrical apparatus which would isolate the supported structure from the forces experienced by the mounting structure. However, with the advent of high density electronic packaging designs wherein the constructional unit is usually an encapsulated module using transistors which are inherently capable of withstanding much higher forces, a change in the packaging philosophy has occurred. Because the components used in an encapsulated module can usually withstand all the forces subjected to the supporting structure, it is now possible to directly affix the electrical equipment to the supporting structure. However, while conventional mounting means strive for the ability to allow direct transmission of vibration into the components themselves, it is seldom accomplished without large increases in overall weight or bulk and usually obtains the unwanted characteristic of progressive amplifications due to the flexure and resonance points of the supporting means.

Accordingly, a feature of the present invention is to provide a method of mounting a plurality of encapsulated modular electrical assemblies upon a supporting surface in as rigid a manner as possible to maintain the vibration and shock amplification factors of the mount as near to "unity" as possible so that the supported unit experiences exactly the same forces as those experienced by the supporting structure. By thus maintaining the amplification factor at or near unity for all expected frequencies of the operating environment, the ability of the supporting structure to resist high applied dynamic forces is increased. The invention accomplishes these purposes with a minimum of structure and, in fact, employs and makes use of the strength of each of the electrical units in compression to form a composite beam wherein the electrical unit itself provides the majority of the moment of inertia of the overall structural member.

The structure of the invention includes a plurality of tension members, preferably bolts, arranged to hold each of a plurality of modular electrical units in predetermined compression. A second plurality of tension members is provided to maintain the framework of the supporting structure in predetermined compression. In this manner the module mounting structure is pre-stressed along its principal axis to a predetermined amount to obtain the required stiffness to withstand, with minimum deflection, any of the shock or vibration normally experienced in the environment for which it is designed. The resultant structure is one which exhibits exceptional strength for its weight because the rigidity is maintained high along with a high section modulus obtained in the compressed electrical units. The structure is also easily expandable to accommodate an increased or decreased number of electrical modules. The invention further employs the compressive relation in which the encapsulated electrical modules are held to advantageously secure heat transfer surfaces therebetween.

A further feature of the invention is that because its basic rigidity is effected by the pretensioning of a bolt or other elongated member to maintain various elements thereof in predetermined compression, it is possible to obtain more nearly identical strengths in all assemblies than hithertofore possible. This reproduceability of strength is the essence of structural reliability and a unique feature of applicant's arrangement.

An object therefore of the invention is to provide an improved method and apparatus for rigidly mounting electrical modules to a supporting surface.

A further object of the invention is to provide a mounting structure which is easily expandable to accommodate a variable number of electrical modules.

A further object of the invention is to provide a high strength, high stiffness mounting structure which is exceedingly low in weight and small in dimension.

A further object of the invention is to provide a novel method of mounting electrical modules employing their inherent compressive strength as the means for obtaining optimum rigidity and strength with a minimum of additional structural material.

A further object of the invention is to provide a mounting structure which has extremely high stiffness and little deflection until the preloaded stress therein has been exceeded by the externally applied forces.

A further object of the invention is to provide an electrical assembly wherein the heat transfer coefficients and parameters are easily predictable and uniform.

A further object of the invention is to provide an improved mounting structure and method which is simple in design, light in weight, expandable in size, extremely rugged and stiff in construction and economical to manufacture.

Other objects and advantages of the invention will become apparent and the invention will be fully understood from the following description of the drawings, in which.

Figure 1:
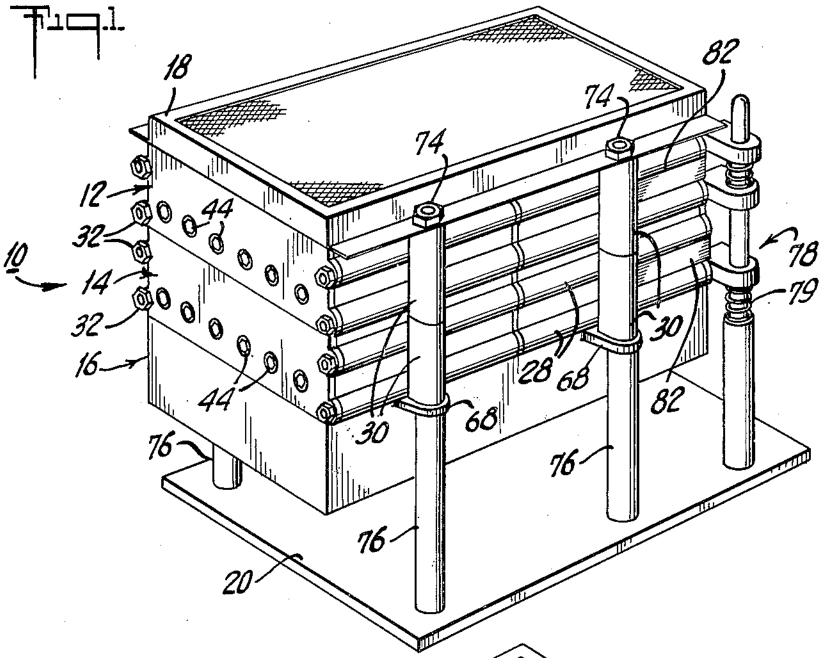
FIG. 1 is a perspective view of a typical electrical package employing the invention.
Figure 2:
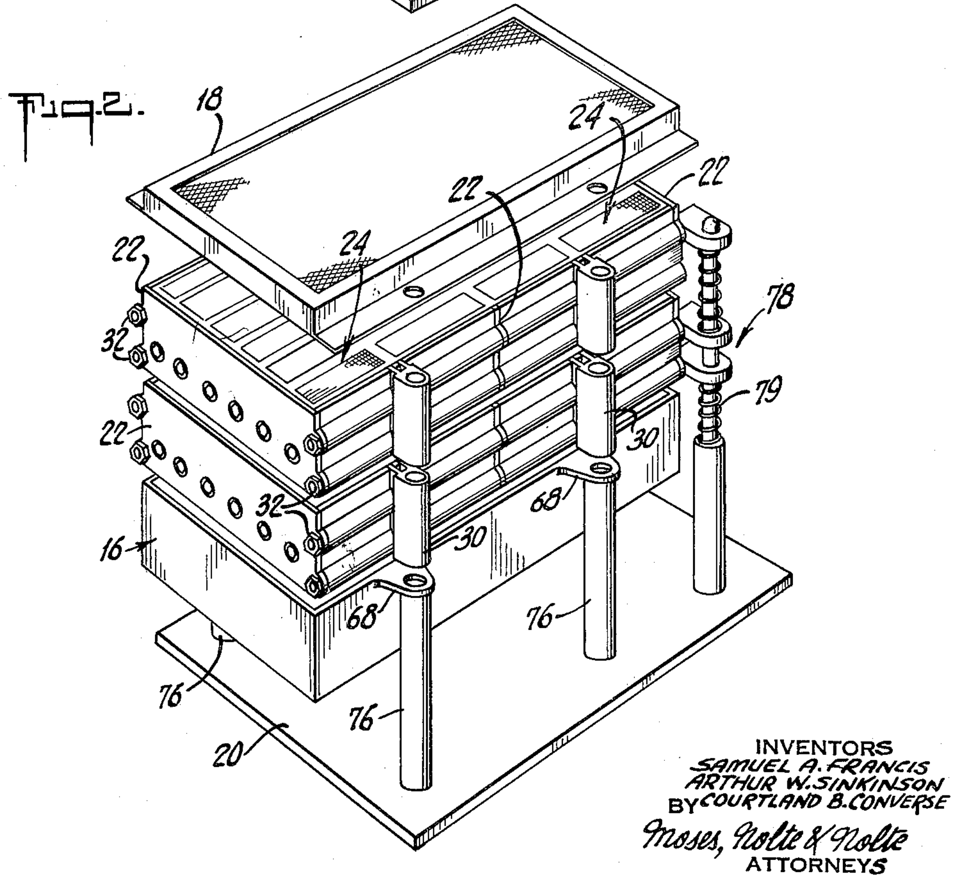
FIG. 2 is a view similar to FIG. 1 showing the various layers of the package in exploded fashion.
Figures 3, 3A:
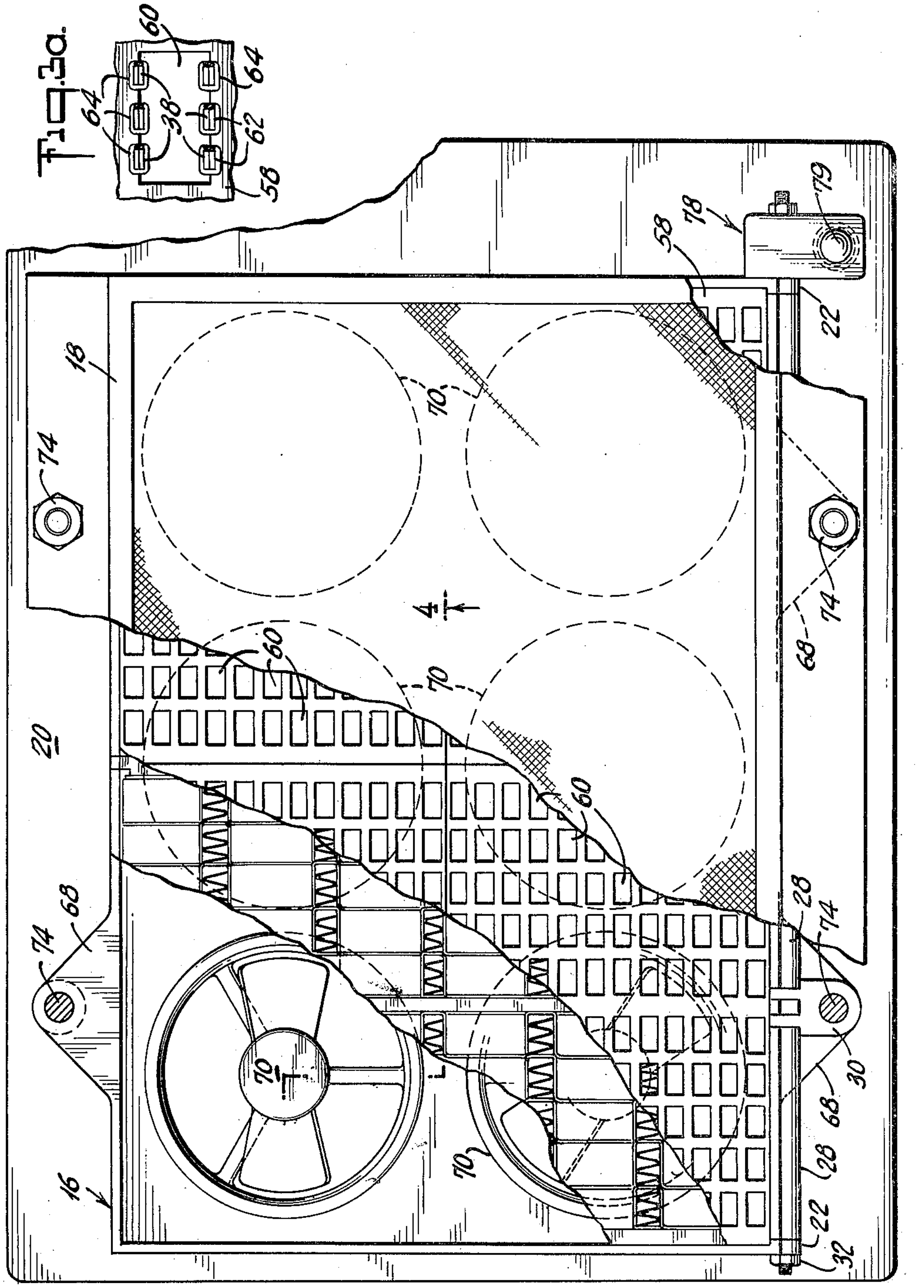
FIG. 3 is a top plan view of FIG. 1 with portions broken away.
Figures 4, 5, 6:
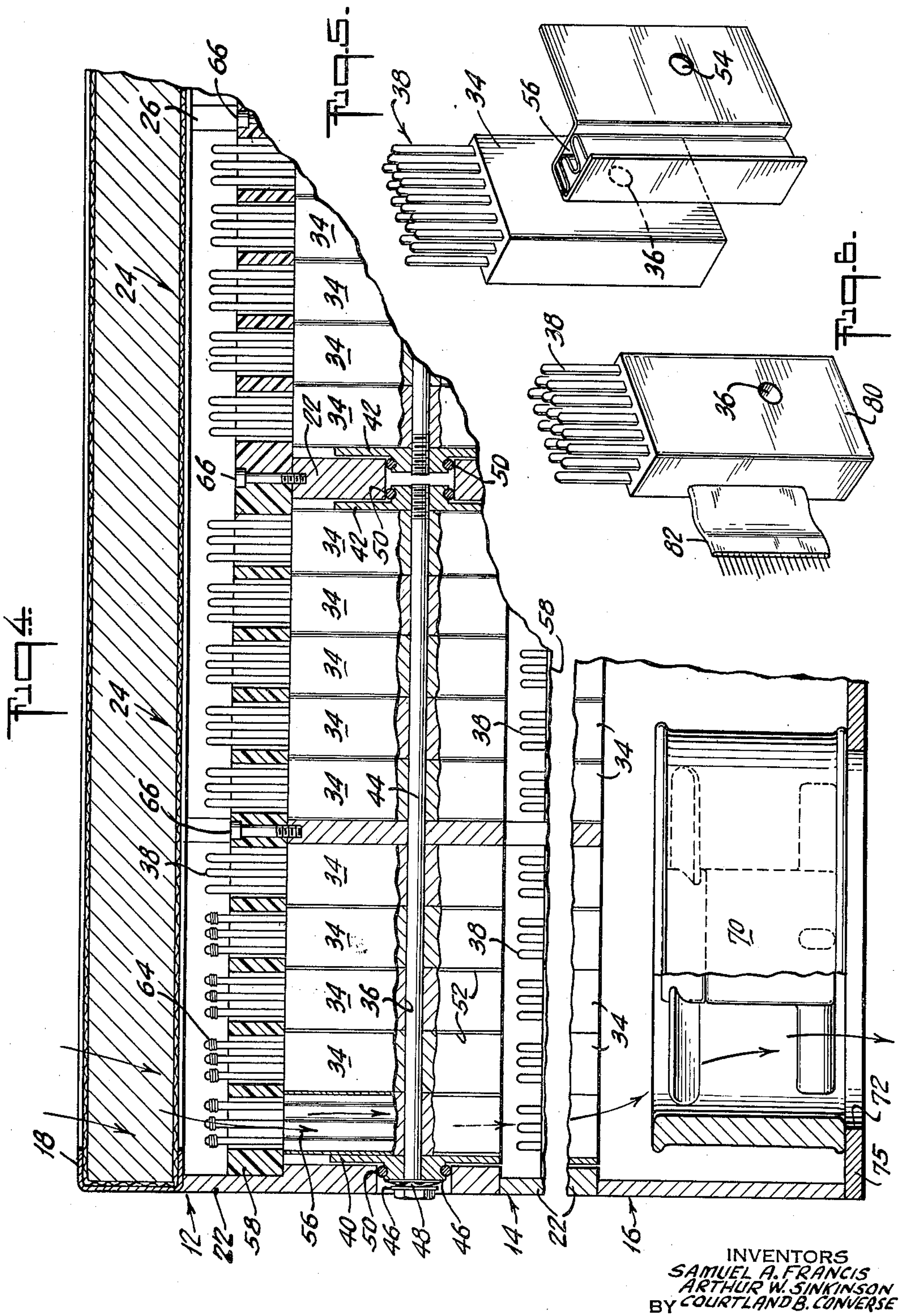

FIG. 3*a* is an enlarged plan view of a portion of FIG. 4 showing the module electrical interconnections;

FIG. 4 is a broken vertical section of the embodiment of FIG. 1;

FIG. 5 is a perspective view of one of the modular electrical units mounted by the structure of the invention as associated with its respective cooling plate; and FIG. 6 is a perspective view of a dummy electrical module and cable employed for electrically interconnecting the units on one layer of the assembly to the units of another layer of the assembly.

Referring to the drawings in particular, the invention shown generally at 10 includes a first structural layer 12 arranged above a second structural layer 14, each of generally rectangular outline. A rectangular air filter 18 and a cooling section 16 are placed respectively above and below the module layers. In the embodiment shown, which is only intended to be illustrative of the mode of mounting these respective four layers to a supporting surface 20, a plurality of tension bolts 74, 74 extend vertically downward through apertures in brackets 30 to secure the layers 12, 14, filter 18 and cooling section 16 in a unitary box-like assembly onto a plurality of studs or posts 76 affixed to the supporting plate 20.

Each of the first and second layers 12 and 14 is essentially identical in mechanical structure and each includes three cross plates 22 held in spaced relation by a plurality of individual side plates 28. Arranged between each of the cross plates 22 in each layer is a support web 26 which carries the basic load of the mounted electrical units outwardly to its ends for transmission to the supporting surface. A plurality of bolt members 32 extend horizontally through aligned apertures in the ends of the cross plates 22, supporting webs 26 and through longitudinal apertures to maintain the side walls of each of the layers in predetermined compressive relation. Straddling the ends of each of the support webs 26 is a bracket 30 having a U-shaped end portion which extends on either side of the web ends and is also secured in compressive relation between the abutting ends of the side plate 28 sections. It will be seen that the rectangular framework formed by the plates 22, 28 and web 26, form a rigid box-like structure having a plurality of structural zones 24 therein on each side of the support web.

Referring to FIGS. 4 and 5, the lefthand support zone 24 of layer 12 is shown in cross section and includes a plurality of vertically oriented electrical modules 34 having aligned apertures 36 extending therethrough. In the example illustrated five units 34 are held in compressive relation on each side of the support web 26 by one of a plurality of tension bolt members 44. The right end of the tension bolt 44 is threadedly engaged to a clamping pad 42 and extends horizontally through each of the apertures 36 of the electrical units 34, and a clearance aperture through the web 26. Under the head of the bolt are a pair of spaced flat washers 46 having a Belleville spring 48 therebetween to hold a head clamping pad 40 against the end surface of the left hand electrical unit 34. Between each of the electrical units 34 may be located an L-shaped cooling plate 52 each having an aperture 54 in horizontal alignment with the aperture 36 in the unit. The foot of the L is formed in a U-shaped cooling fin arrangement having a corrugated heat transfer plate therein to allow passage of cooling air vertically therethrough. Bolt 44 is tightened to a predetermined tension by the turning of the head member to compress the spring 48 and thereby clamp each of the electrical modules 34 in side by side adjacent relationship tightly against the central supporting web 26. Each of the structural zones 24 is provided with a plurality of compressed electrical units 34 arranged across the width of the layer. Each of the clamping pads 40 and 42 is provided with an O-ring seal 50 to allow relative axial movement between the bolt ends and the apertures in the cross plates 22.

Projecting upwardly from each of the electrical modules 34, are plurality of terminals 38 arranged in three groups of six each. Each group of six extends vertically upward through a corresponding rectangular aperture 60 in a rectangular wiring module 58 horizontally supported on the upper side of each of the layers 12 and 14. The wiring module 58 also contains rectangular apertures 60 which are in vertical registration with the fin portion 56 of the cooling plate 52 to allow passage of cooling air upwardly therethrough. About each of the apertures 60 are a plurality of upstanding terminals 62 which are internally electrically connected to conductors (not shown) embedded within the wiring module 58. Each of the upstanding terminals 62 is electrically interconnected to its respective terminal 38 by a wrapped wire conductor 64 of conventional form. These wire wrapped connections 64 assist a plurality of cap screws 66 in rigidly securing the wiring module 58 to the upper surfaces of the webs 22 and 26.

It should be understood that for the purposes of illustration of the invention the internal electrical details of the units 34 and wiring modules 58 have been omitted for clarity.

The lower cooling portion 16 includes a plurality of individual fan assemblies 70 mounted above apertures 72 in a bottom plate 73, so that when operating, the fan draws air through the filter 18 to each of the apertures 60 above the cooling fins 56 and downwardly out the bottom of the unit. The cooling assembly 16 includes a plurality of ears 68 which have apertures in vertical alignment with the apertures in the brackets 30. As previously indicated, bolts 74 extend downwardly through the brackets 30 and ears 68 to engage the mounting studs 76 to hold the assembly secure to the surface 20. Each of the layers 12 and 14 may be provided with a hinge arrangement shown generally at 78 which allows each layer to be pivoted about the post 79 upon removal of the bolts 74 to permit easy access to all the wire wrapped connections 64, etc., on each of the layers.

A dummy or layer inter-connecting module 80 is shown in FIG. 6 and includes a plurality of terminals 38 similar to those terminals on the electrical module 34 which are directly connected to respective conductors in the flexible cable 82 extending from a side thereof. The outer end of the flexible cable 82 is connected into a similar dummy wiring module 80 (not shown) located on the adjacent layer of the electrical assembly. In this manner, electrical interconnection between the wiring modules 58 on each of the layers is accomplished.

In the assembly of the invention, the desired number of electrical units 34 are assembled on their respective tension bolts 44 on either side of the web 26. The predetermined tension in each of the bolts 44 may be readily obtained by simple torque wrench means so that the compression upon each of the modules 34 exceeds any stress normally to be experienced in the intended environment. Therefore, with a pre-stressed or pre-loaded state induced in each of the electrical module stacks by the tensioning of the bolts 44, little deflection of the beam will occur unless the design forces are exceeded. This is so because in the clamping together of elastic members (units 34) with elastic members (bolts 44) only a portion of the applied load or force is effective in producing deflection of the module stack. This portion is dependent upon the product of the cross-sectional area of the clamping bolt times the modulus of elasticity of the clamping bolt in relation to the product of the cross sectional area of the compressed electrical unit to the modulus of elasticity of the electrical unit. Obviously the rigidity is highest the lower this ratio is maintained. The present invention accomplishes these objectives by employing high tensile strength bolt members 44 having a minimum cross-sectional area, as well as a relatively large cross-sectional area for the electrical units. Because the tension of the bolt 44 is applied to the units 34 through the spring 48, changes in ambient temperature will not significantly affect the amount of bolt pretensioning, even though the thermal expansion coefficients of the elements differ substantially. The invention in effect makes the simple beam assembly of the bolt 44 and modules 34 extremely stiff up to and including the point in which the applied force exceeds the pretensioning induced in the bolt by the applied torque wrench setting. The same principle of pretensioning or pre-loading is applied to the side plates 28 of each of the layers 12 and 14 by tensioning the bolts 32 extending therethrough to the desired torque value. Likewise the novel principle is also applied in an axis at right angles to the horizontal axis of bolts 34 by the upstanding bolts 74 to secure the entire assembly to the supporting surface 20.

A further advantage of the invention is that the cooling plates 52 are integrated into the overall structural design so that each plate is held in predetermined compressive contact with the heat transfer surface of its associated electrical unit 34. Because the compressive contact between adjacent units 34 is directly related to the amount of pretension in the bolt 44, the interface heat transfer coefficient between the units and the plates is easily calculated and optimized.

Thus, the invention provides means for mounting and assembling a plurality of encapsulated electrical units in a manner so that the units are held in compression and will deflect very little until the applied force exceeds the pretensioning of the tension means holding the unit in said compression. This principle has been applied in the several principal axes of the resultant structure and thus produces a packaging technique and method wherein encapsulated electrical modules may be mounted directly to the supporting structure without fear of excessive flexure of the mounting means. The invention avoids risk of high shock and vibration amplification inherently associated with non-rigid mounting means. The novel assembly of small pieces by tension members thus produces a more rigid resultant structure wherein the rigidity is obtained largely by the ability of the electrical modules to withstand compression thereby providing a structure of considerable reduced weight and bulk.

While a specific embodiment of the invention has been shown and described in detail to illustrate the application of the invention principles, it will be understood that the invention may be embodied otherwise without departing from such principles.

We claim:

1. A modular electronic assembly comprising at least a pair of spaced substantially parallel end plates having apertures therein, a support web between said plates having apertures in registry with the apertures in said plates, side plate means holding said end plates and said support web in spaced relation, a plurality of modular electrical units arranged on opposite sides of said web, first elongated tension means holding said units in contacting side by side compressive relation, said tension means extending through said web and having ends slidably engaging the apertures in said end plates, and second elongated tension means connecting said side plate means to said end plates and holding said side plate means in compressive relation in an axis substantially parallel to the axis of said first tension means.

2. Apparatus according to claim 1 wherein each of said modular electrical units includes an aperture therethrough and wherein said first elongated tension means extends through each of said apertures.

3. Apparatus according to claim 2 wherein at least one end of said first tension means includes spring means whereby uniform compressive force is maintained upon the electrical units.

4. Apparatus according to claim 1 including bracket means secured to the ends of said support web between the ends of said side plate means.

5. Apparatus according to claim 4 wherein said bracket means includes an elongated aperture therethrough in an axis orthogonal to said first tension means axis.

6. Apparatus according to claim 5 including third elongated tension means extending through the aperture of said bracket means to secure the assembly to its respective support surface.

References Cited by the Examiner

UNITED STATES PATENTS

| | | | |
|---|---|---|---|
| 2,737,579 | 3/56 | Wehrlin et al. | 317—101 |
| 2,788,470 | 4/57 | Giel et al. | 317—101 |
| 2,967,267 | 1/61 | Steinman et al. | 317—101 |
| 2,977,512 | 3/61 | Sinner | 317—101 |
| 3,040,416 | 6/62 | Matlow et al. | 29—155.5 |
| 3,042,999 | 7/62 | Page et al. | 29—155.5 |
| 3,141,999 | 7/64 | Schneider | 317—100 |

JOHN F. BURNS, *Primary Examiner.*